UNITED STATES PATENT OFFICE.

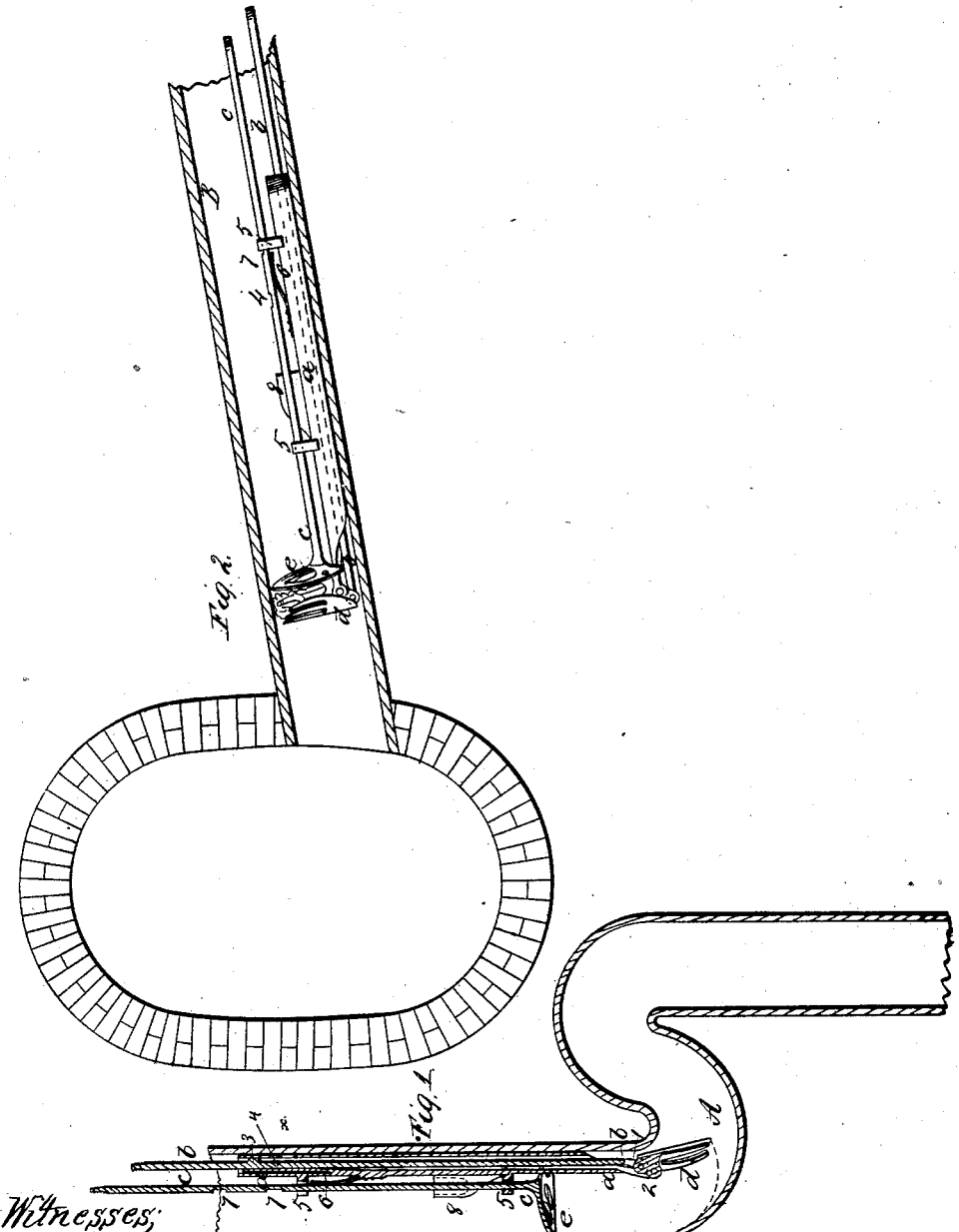

JAMES INGRAM, OF NEW YORK, N. Y.

GRAB FOR CLEARING CONDUITS.

Specification of Letters Patent No. 19,030, dated January 5, 1858.

*To all whom it may concern:*

Be it known that I, JAMES INGRAM, of the city, county, and State of New York, have invented and made certain new and useful Improvements in Grabs for Cleaning Water-Closet Pipes, Drains, or Sewers; and I do hereby declare that the following is a full, clear, and exact description of the construction and operation of the same, reference being had to the annexed drawing, making part of this specification, wherein—

Figure 1, is a vertical section of my apparatus as in use to clear out the trap of a water closet, and Fig. 2, is a side elevation of the same apparatus as in use for cleaning out an inclined drain pipe or sewer, leading to the main sewer in the street.

Similar marks of reference indicate the same parts.

Water closets in buildings are very liable to become choked from servants and others throwing ashes, rubbish, bottles, large pieces of paper and other articles into said water closets, and the same lodging in the trap of the closet, the vertical pipe, or the drain or sewer to the main sewer in the street, obstructs the same, and such obstruction cannot be removed in many cases without cutting open the trap of the closet or the pipe or drain, often greatly to the injury of buildings. The course heretofore pursued has often been to endeavor to force the articles through by a pressure of water, and the consequence is that if the obstruction is washed out of the trap the same may and often does lodge in the vertical or horizontal pipes in a far less accessible place than the trap itself, and sometimes involving the necessity of opening the walls of a house to get at the vertical pipe, or digging up the street to get at the horizontal pipe.

The nature of my said invention consists in the use of a grab, so constructed that the fingers of the same can be forced beyond the obstruction in the pipe trap or drain, and then turned up so as to draw the obstruction or obstructions out of the pipe; and in combination with the same I make use of a clamp or follower acting against any article in the pipe so as to work the same backward and forward if necessary until it becomes loose enough to be drawn out of the pipe or drain.

In the drawing $a$, is a metallic pipe or slide which may be of any desired length or be fitted with a screw, universal joint or other device by which its length may be extended and the instrument adapted to accommodate itself to curvatures in the pipe. The rods $b$, and $c$, are similarly fitted when desired for the same purpose.

The rod $b$, passes through the pipe or slide $a$ and is jointed at its lower end to the wrist 1 of the fingers $d$, which fingers are attached by a rule joint 2, to the lower end of the pipe or slide $a$.

3, is a projection on the rod $b$, kept against the pipe $a$, by a spring 4, in such a manner that when the rod $b$, is forced through the pipe $a$, to turn up the fingers $d$, behind any object contained in the trap A, or pipe B, the said projection springing into a notch or hole $x$, in said pipe $a$, retains the fingers crosswise of the pipe so that they will withdraw any substance they may have grasped, and this generally will be sufficient to remove any obstructions, but to provide for working any thing backward and forward until loosened, I make use of a clamp piece $e$, or a sliding rod $c$, that passes through eyes 5, 5.

6 is a spring acting to throw the notches 7, 7, in the rod $c$, against the eyes 5, and hold the clamp $e$, in place.

The fingers $d$ should be curved so as to slide down close to the side of the pipe, and of such relative lengths as to form nearly a circle, of slightly less diameter than the pipe in which they are to be used. The clamp plate $e$, should be perforated so as to pass freely through any water that may be retained in the pipe.

I am thus enabled to clean out any trap of a water closet, pipe or drain with great facility by my grab, and the said grab is cheap and durable, and can be supplied to parties having water closets so that they can keep them in repair themselves instead of incurring the expense of employing a plumber.

A socket to receive a candle or lamp may be provided as at 8, if desired.

What I claim as my invention and desire to secure by Letters Patent is—

1. The fingers $d$, or their equivalents, set and moving on the pipe or slide $a$, and actuated by the rod $b$, substantially as and for the purposes specified.

2. And in combination with said fingers $d$, so set and actuating I claim the clamp plate $e$, on the rod $c$, for the purposes specified.

In witness whereof I have hereunto set my signature this twenty third day of November 1857.

JAMES INGRAM.

Witnesses:
LEMUEL W. SERRELL,
THOMAS G. HAROLD.